Figures 1, 2, 3, 4:
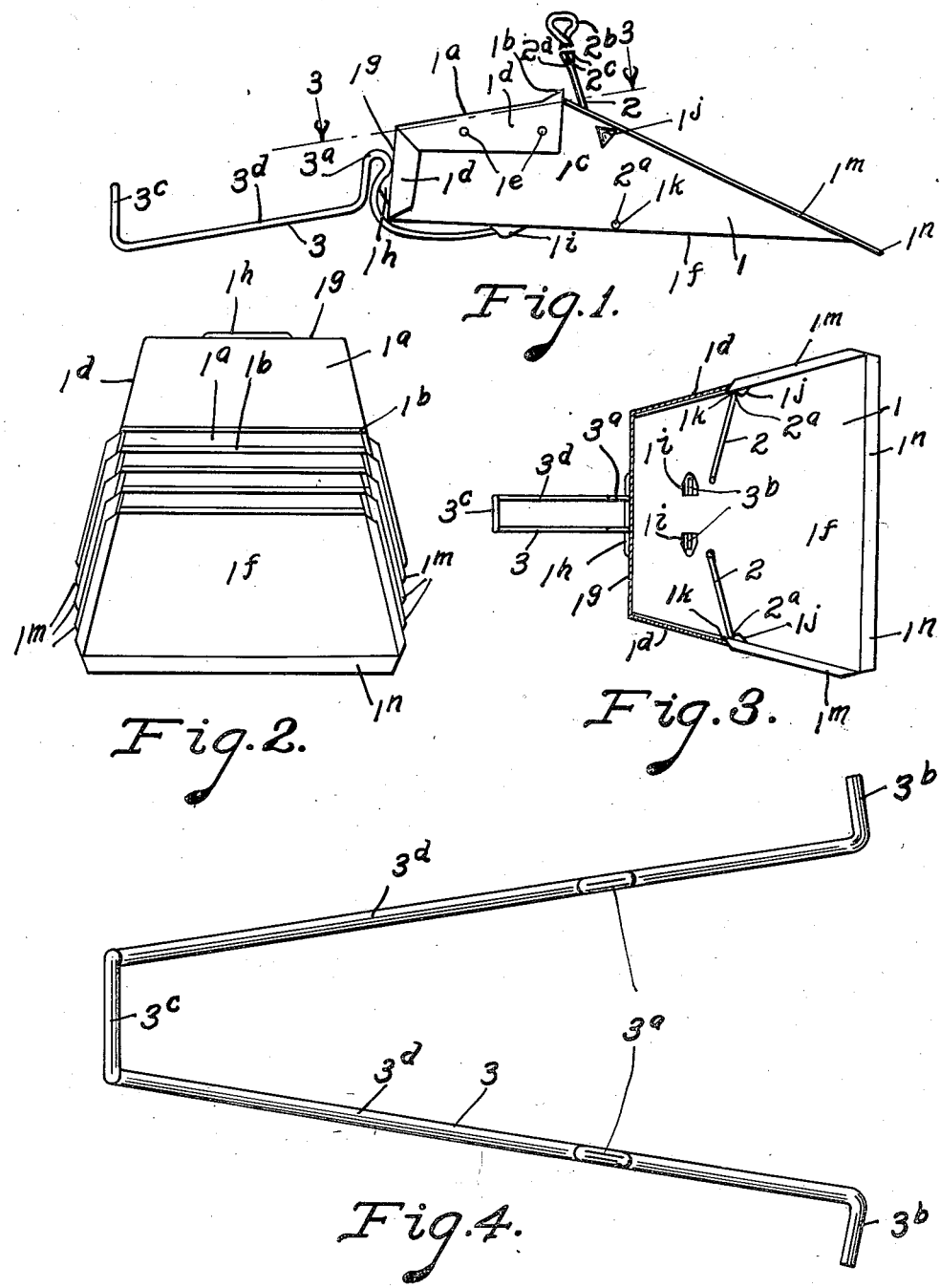

March 24, 1942. C. E. BOWERS 2,277,383
DUST PAN
Filed Sept. 2, 1939

INVENTOR.
Claude E. Bowers
BY A. B. Bowman
ATTORNEY.

Patented Mar. 24, 1942

2,277,383

UNITED STATES PATENT OFFICE 2,277,383

DUSTPAN

Claude E. Bowers, Los Angeles, Calif.

Application September 2, 1939, Serial No. 293,218

4 Claims. (Cl. 65—20)

My invention relates to certain improvements in dust pans, and the objects of my invention are:

First, to provide a dust pan of this class of such shape that it may be easily nested with a series of like pans, which will economize space and storage room, which in turn will lower transportation and storage expense;

Second, to provide a dust pan of this class, the handle and foot rest of which is easily detached;

Third, to provide a dust pan of this class, the body of which may be made of a single piece of sheet metal;

Fourth, to provide a dust pan of this class which can be held by the operator while the operator is standing up;

Fifth, to provide a dust pan of this class which may be held closely to the floor, rug or other surface by the operator's foot; and Sixth, to provide a dust pan of this class which is very simple and economical of construction, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a fragmentary side elevation view of my dust pan; Fig. 2 is a top or plan view of several pans in nested relation, the foot rests and handles of which have been detached; Fig. 3 is a plan section view taken from the line 3—3 of Fig. 1 and Fig. 4 is a top or plan view of the foot rest of my dust pan.

Similar characters of reference refer to similar parts and portions throughout the several views of the drawing.

The pan 1 is substantially fan shaped as shown best in Fig. 3 and is made of one piece of sheet metal. The pan is provided with a hood or cover portion 1a, the front edge of which is turned upwardly at 1b. The sides 1c are overlapped by the downwardly and forwardly extending hood portions 1d and are electrically spot welded to said hood portions 1d, at 1e. It will be noted that the bottom 1f of the pan 1 is turned upwardly at its rear end to form the back 1g, and forwardly to form the hood portion 1a. The back 1g of the pan 1 is provided with an outwardly protruding elongated detent 1h, over which the loop portions 3a of the foot rest 3 are clamped. The pan 1 is also provided with two detents 1i. One end of each detent 1i is open to receive the right angled ends 3b of the foot rest 3. It will be noted that the foot rest 3 is of resilient character, the angular ends 3b of which must be compressed to a close spaced relation in order to insert said angular ends 3b into the open ends of the detents 1i, as shown best in Figs. 1, 3 and 4 of the drawing. The detents 1j of the pan 1 are for the purpose of engaging the handle 2, therefore holding the pan 1 from tilting as it is lifted off of the floor, rug, or other surface by the handle 2. The holes 1k of the pan 1 are adapted to receive the angular ends 2a of the handle 2. The front edge 1n of the pan 1 is bent downwardly in order to fit closely to the floor, rug or other surface. The pan 1 is also provided with outwardly flaring side edges 1m.

The handle 2 is made of one piece of wire bent to form a loop 2b at its upper end and the downwardly extending portions 2c are twisted together as shown in Fig. 1 of the drawing.

The said downwardly extending portions 2c separate at 2d and extend downwardly therefrom at an angle and into the holes 1k of the pan 1.

The foot rest 3 is made of one piece of wire and is provided with upwardly extending loop portions 3a which clamp over the elongated detent 1h of the pan 1. The foot rest 3 is provided with an upwardly extending transverse loop end portion 3c and is also provided with shank portions 3d, the upper sides of which afford a rest for the operator's foot.

The operation of my dust pan is substantially as follows:

As the dust pan is placed on the floor, rug or other surface, and held by the upwardly extending handle 2, the operator's foot is placed on the shank portions 3d of the foot rest 3 and the edge 1n of the dust pan 1 is thereby pressed close to said surface. The rubbish is then swept into the dust pan with a broom or other object.

To fasten the handle 2 to the pan 1, the ends 2a of the handle 2 are compressed to a closer spaced relation and said ends 2a are then released into the holes 1k of the pan 1. To detach the handle 2 from the pan 1, the ends 2a are compressed to a closer spaced relation and are thereby removed from the pan 1.

To fasten the foot rest 3 to the pan 1, the ends 3b of the foot rest 3 are compressed to a closer spaced relation and are released into the open ends of the detents 1i of the pan 1. The loop end portion 3c of the foot rest 3 is then forced upwardly until the loop portions 3a spring over the detent 1h of the pan 1. To detach the foot rest 3 from the pan 1, the loop end portion 3c of the foot rest 3 is forced downwardly until the loop portions 3a spring off of the detent 1h of the pan 1. The said end portions 3b are then compressed into a closer spaced relation and are thereby removed from the pan 1.

Though I have shown and described a particular construction, combination, and arrangement of parts and portions I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a dust pan of the class described, a pan member provided with a cover at its back side and with a pair of integral detents on its lower side with facing open ends and provided with an elongated integral detent at its back side and a rod like foot rest member provided with right angular turned ends adapted to fit into said detents at the bottom of said pan and provided with upwardly turned loop portions adapted to spring over the elongated detent on the back of said pan.

2. In a dust pan of the class described, a pan member provided with a cover at its back side and with a pair of integral detents on its lower side with facing open ends and provided with an elongated integral detent at its back side, a rod like foot rest member provided with right angular turned ends adapted to fit into said detents at the bottom of said pan and provided with upwardly turned loop portions adapted to spring over the elongated detent on the back of said pan, said foot rest extending backwardly some distance and provided with an upwardly turned loop.

3. In a dust pan of the class described, a pan member provided with a cover at its back side and with a pair of integral detents on its lower side with facing open ends and provided with an elongated integral detent at its back side, a rod like foot rest member provided with right angular turned ends adapted to fit into said detents at the bottom of said pan and provided with upwardly turned loop portions adapted to spring over the elongated detent on the back of said pan, said foot rest extending backwardly some distance and provided with an upwardly turned loop, and a rod like handle member pivotally and removably connected to the inner side of said pan near the bottom.

4. In a dust pan of the class described, a pan member provided with a cover at its back side and with a pair of integral detents on its lower side with facing open ends and provided with an elongated integral detent at its back side, a rod like foot rest member provided with right angular turned ends adapted to fit into said detents at the bottom of said pan and provided with upwardly turned loop portions adapted to spring over the elongated detent on the back of said pan, said foot rest extending backwardly some distance and provided with an upwardly turned loop, a rod like handle member pivotally and removably connected to the inner side of said pan near the bottom, and integral detent means on the inner side of said pan for engagement with said handle above its pivotal connection.

CLAUDE E. BOWERS